US012791687B2

(12) United States Patent
Reinhardt

(10) Patent No.: US 12,791,687 B2
(45) Date of Patent: Nov. 10, 2026

(54) CALIBRATION SYSTEM FOR 3D FLASH LIDAR IMAGERS

(71) Applicant: Exciting Technology LLC, Dayton, OH (US)

(72) Inventor: Andrew Reinhardt, Ironton, OH (US)

(73) Assignee: Exciting Technology LLC, Dayton, OH (US)

( * ) Notice: Subject to any disclaimer, the term of this patent is extended or adjusted under 35 U.S.C. 154(b) by 873 days.

(21) Appl. No.: 18/155,426

(22) Filed: Jan. 17, 2023

(65) Prior Publication Data

US 2023/0228856 A1 Jul. 20, 2023

Related U.S. Application Data

(60) Provisional application No. 63/300,220, filed on Jan. 17, 2022.

(51) Int. Cl.
*G01S 7/497* (2006.01)
*G01S 17/894* (2020.01)

(52) U.S. Cl.
CPC ............ *G01S 7/497* (2013.01); *G01S 17/894* (2020.01)

(58) Field of Classification Search
None
See application file for complete search history.

(56) References Cited

U.S. PATENT DOCUMENTS

2021/0373137 A1* 12/2021 Tan .......................... G01S 7/497
2022/0128661 A1* 4/2022 Wang ...................... G02B 6/124
2023/0176198 A1* 6/2023 Mielke .................... G01S 17/10
356/4.01

* cited by examiner

*Primary Examiner* — Eileen M Adams
(74) *Attorney, Agent, or Firm* — GTC Law Group PC & Affiliates

(57) ABSTRACT

A system for calibrating a light detection and ranging (LiDAR) sensor comprises an optical transmission source, a coarse adjustment optically coupled to the optical transmission source, an optical device optically coupled to the coarse adjustment, a fine adjustment optically coupled to the optical device, and a lens optically coupled to the fine adjustment. Light from the optical transmission source passes through the coarse adjustment, the optical device, the fine adjustment, and the lens to illuminate a LiDAR sensor under test. Further, a single optical transmission source, coarse adjustment, and optical device may be coupled to a splitter to test multiple LiDAR sensors at once, where each LiDAR sensor is associated with an individually controlled fine attenuator and an individually controlled variable lens.

20 Claims, 15 Drawing Sheets

CALIBRATION SYSTEM FOR 3D FLASH LIDAR IMAGERS

CROSS REFERENCE TO RELATED APPLICATIONS

This application claims the benefit of U.S. Provisional Patent Application Ser. No. 63/300,220, filed Jan. 17, 2022, entitled "CALIBRATION SYSTEM FOR 3D FLASH LIDAR IMAGERS", the disclosure of which is hereby incorporated by reference.

STATEMENT REGARDING FEDERALLY SPONSORED RESEARCH OR DEVELOPMENT

This invention was made with government support under Contract No. 80NSSC19C0073 awarded by the National Aeronautics and Space Administration. The government has certain rights in the invention.

BACKGROUND

Field of the Invention

Aspects herein pertain to the calibration of sensors, and in particular to the calibration of three-dimensional sensors, such as may be used in 3D flash LiDAR imagers.

Description of the Related Art

LiDAR is a technology that utilizes laser light that targets an object of interest. More specifically, the LiDAR system measures the time for the reflected light to return to a receiver to determine a distance of the object of interest from the LiDAR system. The ability to measure laser light travel time also enables the LiDAR system to make digital 3-D representations of objects, due to differences in laser return times. However, the accuracy of such a LiDAR system is dependent, at least in part, upon the quality and calibration of the LiDAR sensor.

BRIEF SUMMARY

According to aspects of the present invention, a system for calibrating a light detection and ranging (LiDAR) sensor comprises an optical transmission source, a coarse adjustment optically coupled to the optical transmission source, an optical device optically coupled to the coarse adjustment, a fine adjustment optically coupled to the optical device, and a lens optically coupled to the fine adjustment. Light from the optical transmission source passes through the coarse adjustment, the optical device, the fine adjustment, and the lens to illuminate a LiDAR sensor under test. Further, a single optical transmission source, coarse adjustment, and optical device may be coupled to a splitter to test multiple LiDAR sensors at once, where each LiDAR sensor is associated with an individually controlled fine attenuator and an individually controlled variable lens.

DETAILED DESCRIPTION

Figure 1:
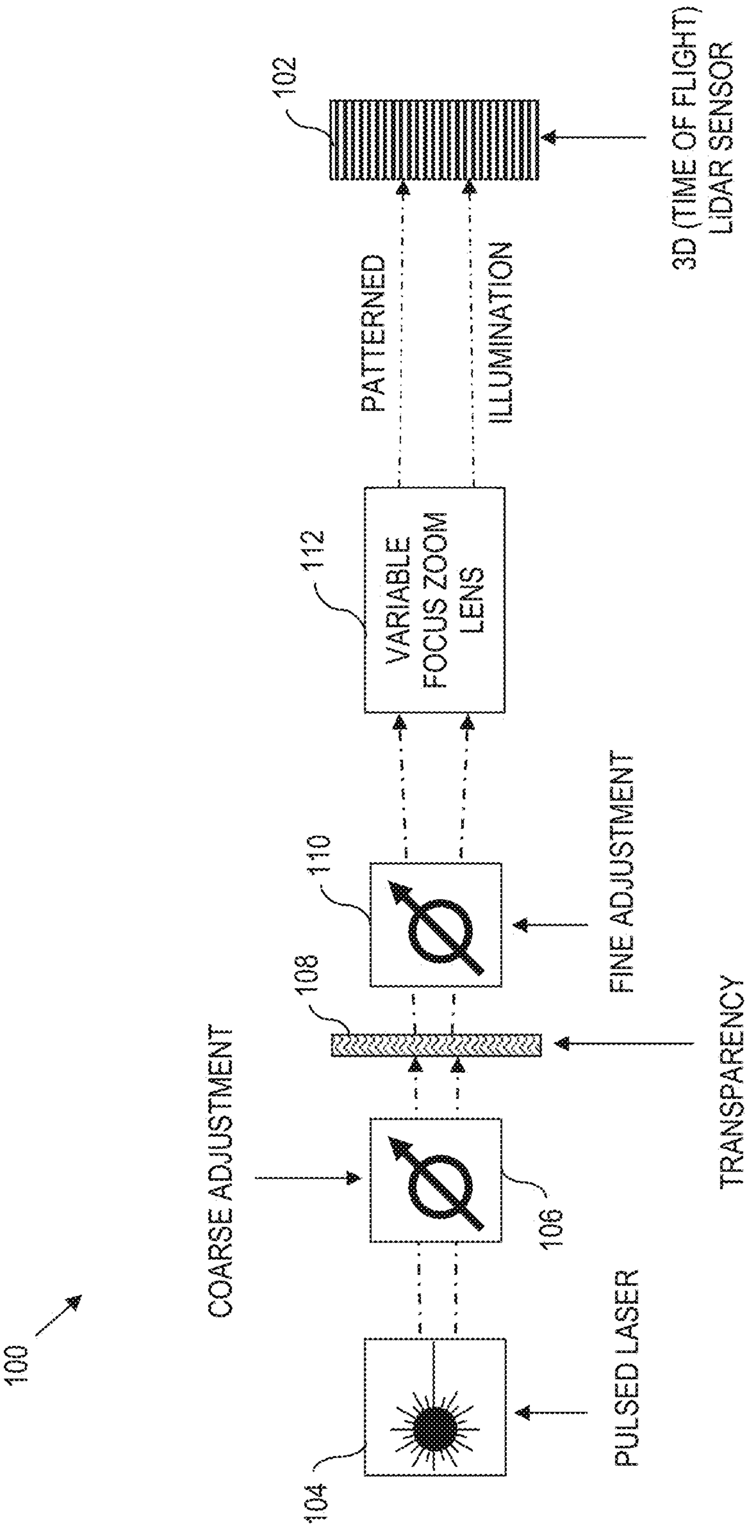
FIG. 1 is a block diagram of a system for calibrating a LiDAR sensor according to aspects herein.

Aspects of the present disclosure provide a system and process for rapidly characterizing and calibrating response-specific parameters for sensors such as Light Detection and Ranging (LiDAR) sensors. For instance, a practical application herein provides a system and process for rapidly characterizing and calibrating critical response-specific parameters (e.g., range walk and gain-error (photo-response) non-uniformity) for three-dimensional (3D) time-of-flight LiDAR sensors (e.g., full arrays, linear detector arrays, single detectors, etc.).

A conventional approach to 3D time-of-flight LiDAR calibration relies upon lengthy sampling to perform lab-based calibration and characterization. An alternative conventional approach includes designing the optical system to circumvent image artifacts and noise. Yet another conventional alternative approach uses machine learning processes to carry out calibration. Such conventional calibration methods add significant cost. Moreover, in terms of using machine learning processes on-the-fly, questions about safety and viability arise when alternatives can be provided.

Aspects herein are directed towards 3D time-of-flight LiDAR sensor technology, and can significantly reduce the time and effort, and thus cost, to fully deploy such sensors. Different embodiments herein can scale this process from either a single sensor to simultaneous operation on multiple sensors with minimal additional cost, effort, or time. As such, aspects herein are usable in numerous applications, such as to provide calibrated LiDAR sensors for LiDAR systems in vehicles including autonomous vehicles, for characterizing laser rangefinders, e.g., which may find application in the defense industry, etc.

Moreover, typical applications for autonomous vehicles tend towards linear arrays of avalanche photodiode (APD) sensors. However this trend is born out of cost, with linear arrays requiring scanning mechanisms rather than using wide field of view arrays. However, aspects herein reduce the cost to deploy a detector array, thus enabling usage as a technology.

In an example implementation for a single camera (a 3D flash LiDAR), an embodiment of a system described more fully herein can generate enough data within a reasonable time window (e.g., within 15 minutes or less) to characterize the range walk error and intensity response. Moreover, enough data can be collected in a reasonable time (e.g., in under one minute) to characterize the timing ramp and provide a gain-error map of the return.

Yet further, two-dimensional (2D) imaging arrays are often characterized using laboratory calibration techniques, e.g., typically using an integrating sphere. However, three-dimensional (3D) flash LiDAR imagers typically avoid calibration techniques associated with 2D sensors (e.g., randomizing pulse time-of-flight information in three-dimensional (3D) time-of-flight sensors render such techniques inoperable). Instead, 3D calibration techniques typically operate on a principle of sampling detector responses to produce an average characterization of the sensor.

However, linear-mode avalanche photodiode (APD) and PIN diode 3D flash LiDAR imagers suffer from significant electronic crosstalk, while not suffering from significant optical crosstalk, as is the case with Geiger-mode APD imagers. Thus far, conventional systems are unable to mitigate the electronic crosstalk in linear-mode APD and PIN 3D flash LiDAR imagers. However, aspects herein provide a production-line capacity to this problem.

Conventionally, production costs will always be higher, or image quality will always be lower, because the cameras cannot be fully calibrated in a lab setting without spending considerable time and effort, thus money, on doing so. Current state of the art calibration can take weeks or longer to characterize, where systems and processes herein can perform the calibration evaluations in minutes.

According to aspects herein, a spatial light modulator is used to structure light into patterns appropriate to mitigate electronic crosstalk. For instance, a spatial light modulator can be used to structure light into patterns appropriate to mitigate electronic crosstalk associated with linear-mode APD and PIN 3D flash LiDAR imagers.

A timing synchronization system between an imager and a transmitter enables the characterization of a timing ramp that converts time of flight information to a digital readout value. Variable attenuation enables characterization of an intensity response, range walk error, and related correlations between intensity and range.

Figure 2:
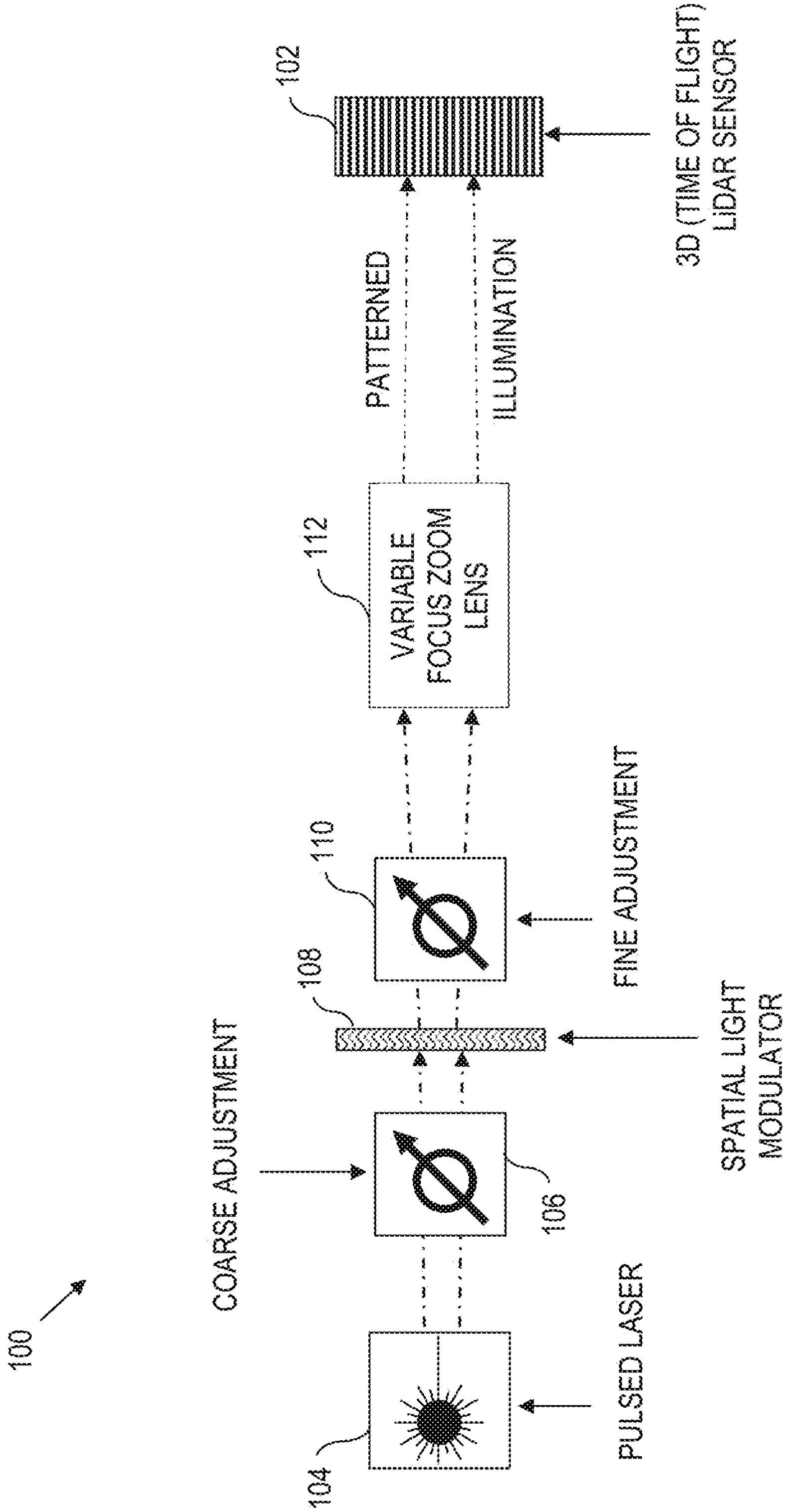
FIG. 2 is a block diagram of a system for calibrating a LiDAR sensor according to aspects herein.

Referring to drawings and in particular to FIG. 1 and FIG. 2, an example system 100 is illustrated, which is capable of calibrating a sensor 102. For instance, in some embodiments, the system 100 can calibrate a single 3D LiDAR sensor with ranging based on time-of-flight principles, for instance a 3D flash LiDAR camera or a laser rangefinder. Moreover, in some embodiments, the calibration is carried out in a manner that enables calibration and characterization of gain error (photo-response) non-uniformities and range walk error in a compact system capable of collecting and processing data automatically within a brief period of time per sensor, for instance one hour or less.

For purposes herein, a camera (i.e., an imaging system) includes one or more sensors (e.g., analog, digital, or both), where a sensor is a detector or an array of detectors. For example, a single detector may represent a single pixel for a digital camera.

As illustrated in FIG. 1 and in FIG. 2, an optical transmission source 104, e.g., a pulsed laser, transmits light, which is processed via a coarse adjustment (e.g., via free-space or fiber optic through a variable attenuator) 106, which is used to coarsely control attenuation. This coarse control of attenuation can be tied to a LiDAR link, e.g., so as to coordinate with a gain of the optical transmission source 104 (e.g., to coordinate with avalanche photodiode (APD)) gain. In an example configuration, the coarse control 106 can be set to a level slightly above an estimated level for saturation for the sensor 102.

The output of the coarse adjustment 106 is passed through an element 108, such as a transparency (FIG. 1) or a spatial light modulator (FIG. 2). Regardless, the light then passes from the element 108 to a fine adjustment 110.

The fine adjustment 110, e.g., via a fine adjustment variable attenuator, can be set to block the signal, incrementally increasing the signal until a feedback controller (not shown in FIGS. 1-2) from the calibrated sensor's 102 return determines the sensor 102 has reached saturation or is approaching saturation. The variable attenuator 110 can be located after the transparency (FIG. 1, 108) or spatial light modulator (FIG. 2, 108), that imparts a pattern, for instance a checkerboard pattern, onto the light (i.e., the illumination) to create a patterned illumination. This patterned illumination is then adjusted via a variable focus zoom lens 112.

Light from the fine adjustment passes through a variable focus zoom lens and a patterned illumination is impinged upon a 3D LiDAR sensor, e.g., a 3D time of flight LiDAR sensor.

In a practical embodiment, the variable focus zoom lens 112 is an optical device that can incrementally adjust the lens system focal length within a set range. Provided a fine enough incrementing of the focal length, the magnification can be matched to minimize sampling issues from any pattern created through a phase grating or spatial light modulator 108. Because spatial over or under sampling of a focal plane array will significantly increase the interframe noise where that sampling is occurring, a feedback sample process can be used that computes an average value of interframe variance for a set number of sample frames, for instance 100 frames. In some embodiments, this average value of the interframe variance can be continuously computed while a varifocal lens is incrementally adjusting the focal length from its minimum value to its maximum value.

Figure 3:
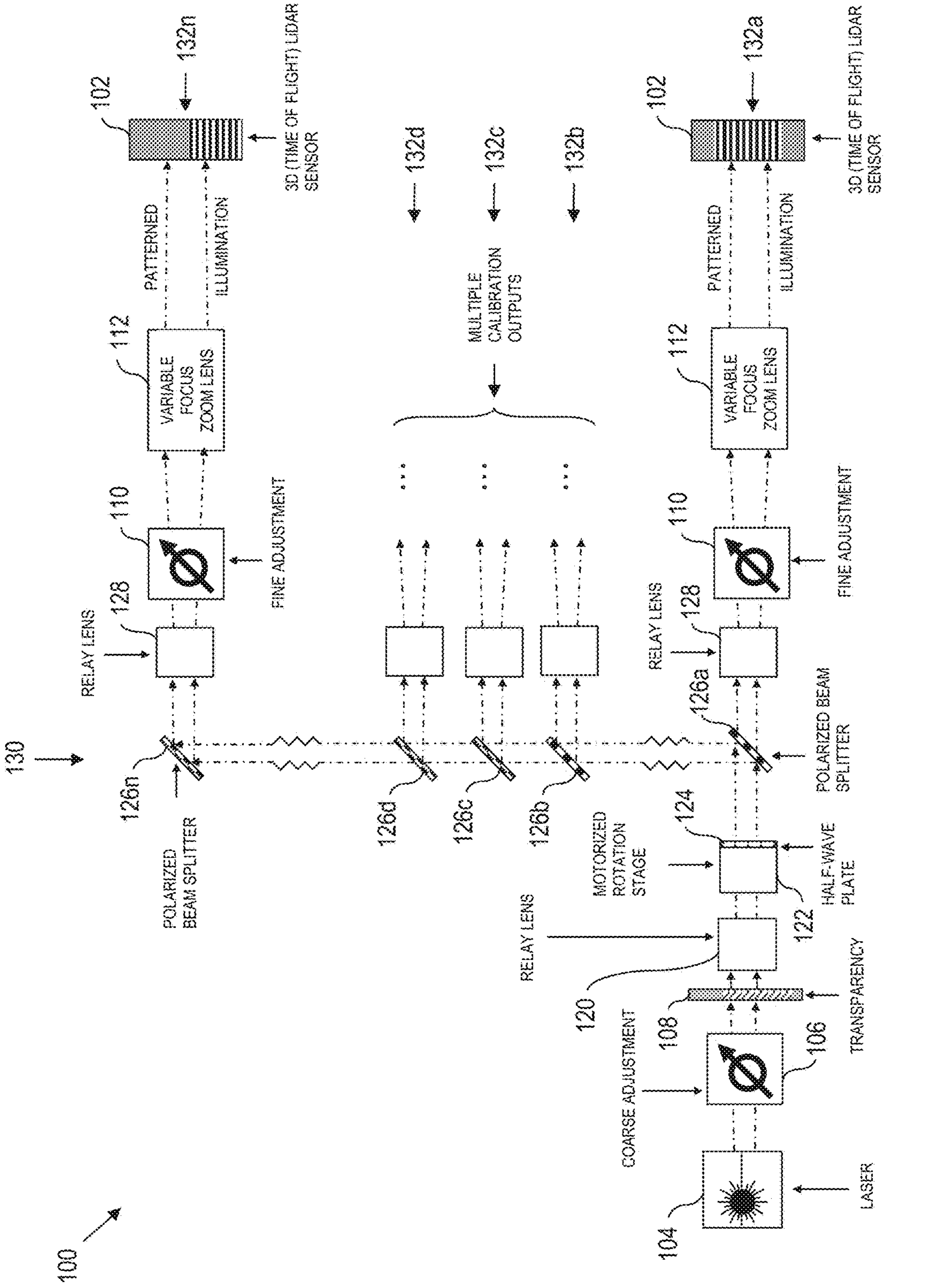
FIG. 3 is a block diagram of a system having multiple calibration outputs for calibrating multiple LiDAR sensors at the same time, according to aspects herein.
Figure 4:
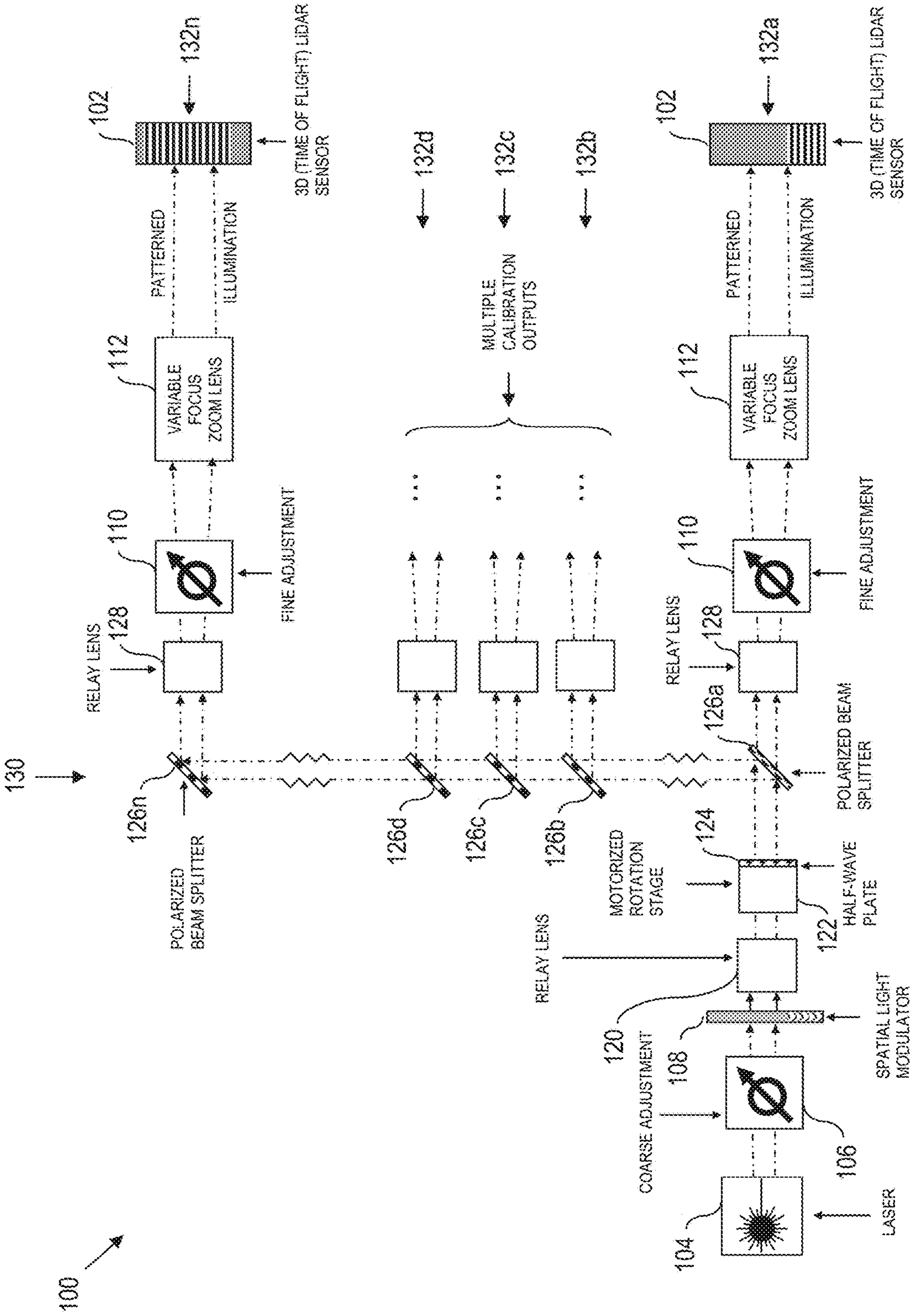
FIG. 4 is a block diagram of a system having multiple calibration outputs for calibrating multiple LiDAR sensors at the same time, according to aspects herein.

Referring to FIG. 3 and FIG. 4, a second embodiment of the system 100 describes an expansion of the first embodiment to a system (see 100, FIGS. 1-2) capable of performing the same functions in the first embodiment, simultaneously on a set number of sensors (e.g., cameras), M, in a scaled production capacity.

Analogous to FIG. 1 and FIG. 2, an optical transmission source 104, e.g., a pulsed laser, transmits light, which is processed via a coarse adjustment 106 (e.g., via free-space or fiber optic through a variable attenuator), which is used to coarsely control attenuation. This coarse control of attenuation can be tied to a LiDAR link, e.g., so as to coordinate with a gain of the optical transmission source (e.g., to coordinate with avalanche photodiode (APD)) gain. Analogous to that of FIG. 1 and FIG. 2, in an example configuration, the coarse control 106 can be set to a level slightly above an estimated level for saturation for the sensor 102.

The output of the coarse adjustment 106 passes through an optical element 108, e.g., a transparency (FIG. 3) or a spatial light modulator (FIG. 4) that imparts a pattern, for instance a checkerboard pattern, onto the illumination.

Different from FIG. 1 and FIG. 2, the output of the transparency (FIG. 3) or a spatial light modulator (FIG. 4) passes through a relay lens 120. The output of the rely lens 120 passes to a motorized rotation stage 122, which directs the light through a half-wave plate 124. The output of the half-wave plate 124 passes to a polarized beam splitter 126 where the light is split.

A first path from the polarized beam splitter passes to a relay lens 128. The output of the relay lens passes to a fine adjustment 110. The fine adjustment 110 can be analogous to the fine adjustment 110 of FIG. 1 and FIG. 2. For instance, the fine adjustment 110 can be implemented via a fine adjustment variable attenuator, which can be set to block the signal, incrementally increasing the signal until a feedback controller from a calibrated sensor's return determines the sensor 102 has reached, or is approaching, saturation. The variable attenuator is thus located downstream of the transparency (FIG. 3) or spatial light modulator (FIG. 4), that imparts a pattern, for instance a checkerboard pattern, onto the light (i.e., the illumination) to create a patterned illumination.

The output from the fine adjustment 110 is passed through a variable focus zoom lens 112 where the patterned illumination is then adjusted. The output of the variable focus zoom lens 112 outputs a pattered illumination on the sensor 102, e.g., a 3D time of flight LiDAR sensor.

Analogous to that previously described, in a practical embodiment, the variable focus zoom lens 112 is an optical device that can incrementally adjust the lens system focal length within a set range. Provided a fine enough incrementing of the focal length, the magnification can be matched to minimize sampling issues from any pattern created through a phase grating or spatial light modulator. Because spatial over or under sampling of a focal plane array will significantly increase the interframe noise where that sampling is occurring, a feedback sample process can be used that computes the average value of the interframe variance for a set number of sample frames, for example one-hundred frames. In some embodiments, this average value of the interframe variance can be continuously computed while a varifocal lens is incrementally adjusting the focal length from its minimum value to its maximum value.

In an example embodiment, a relay lens 120 is placed after the coarse adjustment 106 variable attenuator and the element 108, (e.g., the transparency (FIG. 3) or spatial light modulator (FIG. 4)), to collimate the illumination before being relayed (via free-space, fiber optics, or a combination thereof) to multiple end-track calibration systems. A half wave plate 124 rotates the polarization of the beam immediately after this first relay lens 120. A series of polarized beam splitters 126*a-n* split the beam between reflecting to additional sensors 102 to be calibrated, or transmitting through the system to enable additional end-track calibration systems. By aligning the half wave plate, and polarization, appropriately, the illumination can be both maximized and equalized for every sensor 102 along the track. The last sensor in the end-track calibration line will have a polarized beam splitter 126*n* with a beam dump further downrange, to ensure consistent illumination among calibrated sensors.

For instance, from a first polarized beam splitter 126*a*, light can be directed along a second optical path 130. The second path facilitates multiple calibration outputs by inserting into the second optical path, any number of calibration output subsystems 132*b-n*. Each calibration output subsystem comprises a calibration output optical path that includes a polarized beam splitter 126*b-n*. A first output of the beam splitter continues along the second optical path, whereas a second output is directed to a relay lens, which outputs to a fine adjustment, which outputs to a variable focus zoom lens, which outputs a patterned illumination to a 3D LiDAR sensor, e.g., a 3D time of flight LiDAR sensor, in a manner analogous to that described more fully herein.

Thus, in the illustrated embodiment, the ending sections of all end-tracks are identical, comprising a relay lens 134, a fine adjustment variable attenuator 110 and variable focus zoom lens 112. In example embodiments each of the variable focus zoom lenses is independently controlled by each individual sensor being calibrated, and the sensor itself.

Embodiments herein may require a timing system capable of synchronizing the operation of multiple components to be externally triggered by a sensor acting as master. In the case of the multi-sensor system, the primary arm of the system, which is described as the arm of the system when the path of the beam is not deviated by the beam splitter, acts as master.

Figure 5:
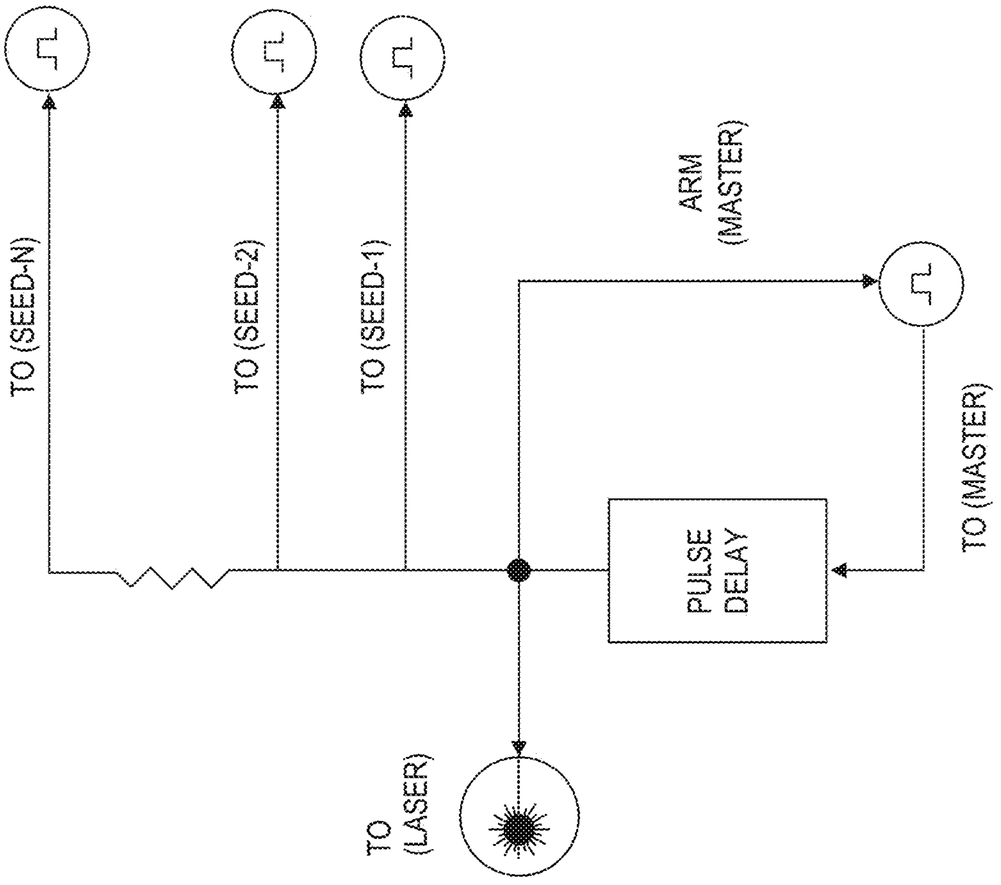
FIG. 5 is a block diagram of a pulse delay circuit that outputs to a laser for calibrating a LiDAR sensor according to aspects herein.

All subsequent sensors can be triggered through a series of secondary signal relays, as depicted in FIG. 5, by having a seed trigger generated from the sensor master trigger, operating in a synchronous manner with the return signal for the master sensor and the laser external trigger signal. This seed trigger can be fed to independently trigger every other sensor in the system in synchronous with the master sensor, while remaining in synchronous with the laser. Thus, within the limits of electronic technology for such systems, a system can be constructed that simultaneously calibrates many sensors, rather than just a single sensor at a time.

For instance, as illustrated in FIG. 5, and ARM (Master) signal triggers a TO (Master) signal, which feeds a pulse delay. The output from the pulse delay is coupled to a laser, and to one or more seeds (Seed-1; Seed-2 . . . Seed-N) as illustrated.

Figure 6:
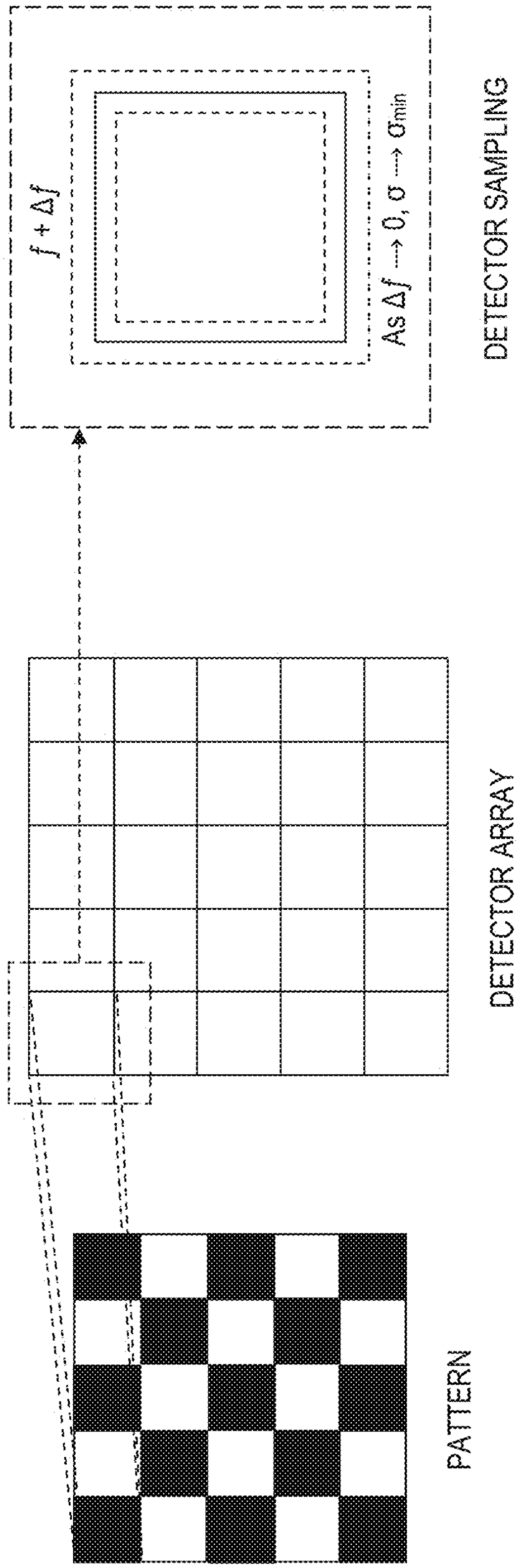
FIG. 6 is a block diagram illustrating a pattern, detector array, and detector sampling according to aspects herein.

Referring to FIG. 6, a pattern, such as a checkerboard of alternating light and dark squares, can be used to bypass the electronic crosstalk on a time-of-flight LiDAR sensor. The pattern can be constructed using a thin transparency or a spatial light modulator, as discussed herein. A spatial light modulator provides a more adaptive solution while the transparency can provide a far more cost-effective solution, as the pattern on the transparency can be extrapolated using software and then printed directly onto a thin film or using 3D printing techniques etching out of, or constructing a surface. Thus, a transparency significantly reduces cost. In either case, a practical embodiment may need to adjust the magnification of the system to prevent spatial over or under sampling.

Alternatives to a checkerboard pattern that are capable of mitigating electronic crosstalk in this class of sensors are application specific. An alternative pattern for Geiger-mode APD 3D flash LiDAR sensors alternates the target pattern either randomly or through a series of sequential rotations to build up the bins for a range histogram for each detector. This data can be used to develop a gain error curve when appropriately varying parameters such as timing delay and attenuating the signal. This randomized bin data can also be correlated with bins from the corresponding intensity return to generate a range walk error characterization and correction. Thus, by changing the pattern and adjusting the data collection process, the system is applicable to both linear-mode and Geiger-mode sensors.

The various embodiments herein represent a significant step beyond the current state of the art. Current state of the art either collects enough samples of detector responses on the array to characterize the global response of the array, without regard to detector-specific characterization for the entire array, or use onboard machine learning processes to optimize the scene. Both of these approaches fail to perform characterization of sensors to the standard of typical 2D sensor arrays. However, a calibration and characterization of time of flight sensor arrays is provided here, for a full detector array, with a significant improvement in time and effort on the order of $M \times N^2$ where N is the linear number of detectors and M is the number of sensors being calibrated.

An example advantage of the system herein is the ability to scale the post-production process of calibration and characterization of 3D, time-of-flight ranging LiDAR sensors, thus reducing cost. Production capacity may reduce cost, but the capability to characterize and calibrate sensors of this class at large production volumes is currently lacking. This enables the production of large volumes of sensor systems by significantly reducing post-production cost.

In some embodiments, for full detector array systems, the cost scales by $1/(M \times N^2)$ detectors, while for linear arrays, the cost can scale by $1/(M \times N)$ detectors, where M is the number of sensors being calibrated. For a single detector, the advantage can scale by 1/M sensors being calibrated. Thus, there is always some advantage in a multi-sensor system regardless of whether the user is calibrating full detector arrays, linear detector arrays, or single detectors, though the system improves by a factor of N detectors for every linear dimension of detectors.

Aspects herein bring about technical advantages including a simplicity of operation of the system, replaceability of key components of the system, and automation of the system. Operation by the end user is push button, and requires little more than sliding the appropriate sensors into their pre-positioned holder, running the system, and validating the output for quality assurance. The process should be fast and relatively hands-off. Should a component malfunction, that part, rather than the whole apparatus, can be replaced.

Aspects herein provide an improvement on the state of the art for 3D LiDAR imagers ranging using a pulsed time of flight principle of operation. Moreover, the advantages of this system are greatly enhanced when used in a scalable production capacity. That is, cost reduces significantly with the addition of more imagers to the system. While still advantageous even for just one imager, it should be noted that this same principle applies also to detector array size, until reaching critical physical limitations of the system.

As noted more fully herein, aspects herein provide a process by which 3D flash LiDAR linear detector arrays can be characterized, with a secondary result of an image lookup table from the same process, in a compact, automated system minimizing cost, time, and effort.

Specifically, example configurations herein can utilize a pulsed laser with fiber output, fed to a series of two variable fiber attenuators. Other embodiments may use only one variable fiber attenuator or a longer series. For instance, a single variable fiber attenuator could include simplification of the system. Possible reasons for using more than two attenuators include additional safety mechanisms on high gain sensors or sensors exhibiting issues such as a high false alarm rate.

In some embodiments herein, an iris provides a good mechanism for emergency shutting of light. Moreover, some embodiments have a feedback control to automatically close an iris before sensors reach critical levels is a good addition.

Figure 7:
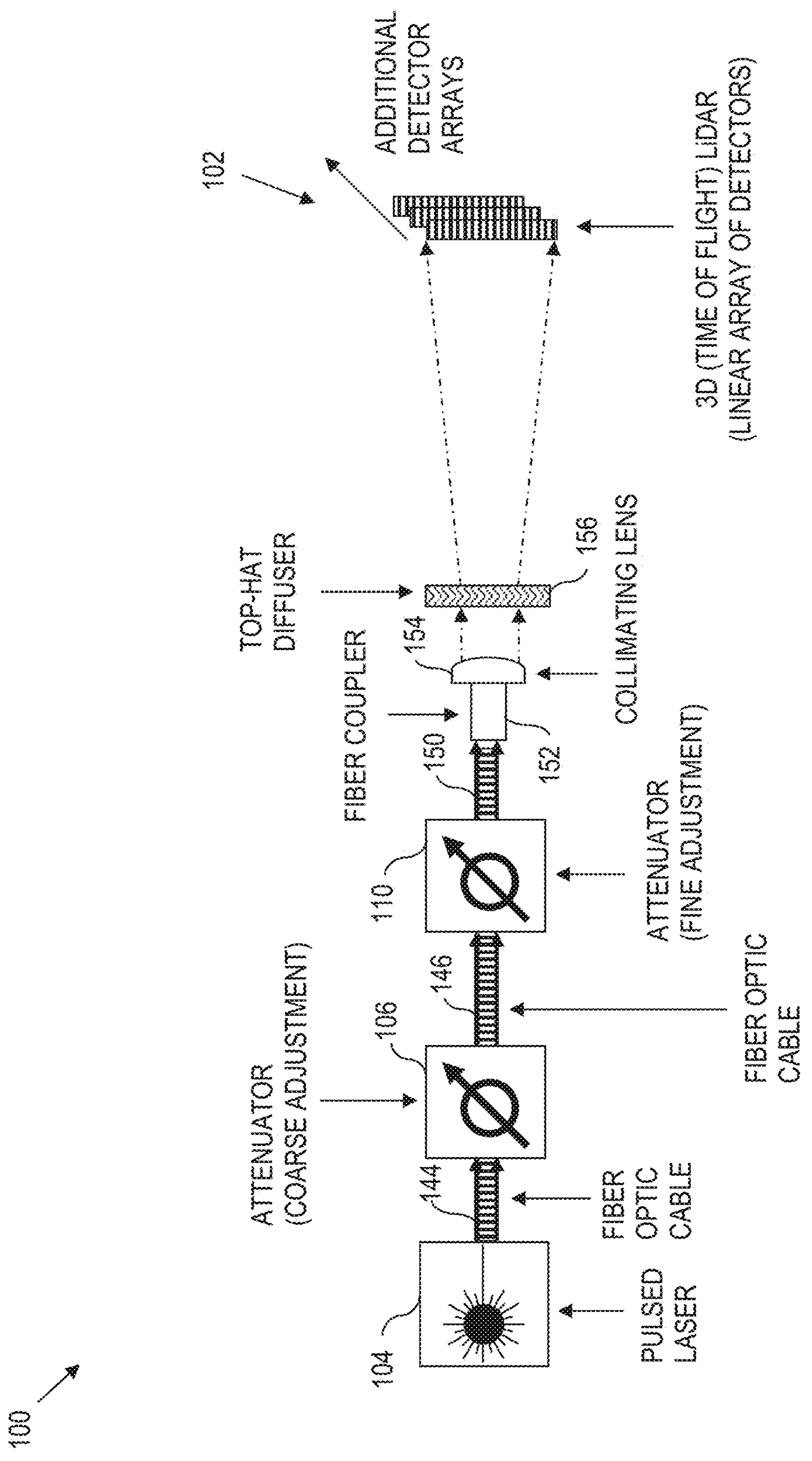
FIG. 7 is an example block diagram illustrating yet another LiDAR calibration system.

Referring to FIG. 7, another block diagram illustrates yet another LiDAR calibration system configuration. The illustrated system includes a pulsed laser source 104 that couples a signal via a fiber optic cable 144 to a course adjustment attenuator 106 (analogous to that described more fully herein). The output of the course adjustment attenuator passes via a fiber optic cable 146 to a fine adjustment attenuator 110 (analogous that that described more fully herein). The output of the fine adjustment attenuator is coupled via a fiber optic cable 150 to a fiber coupler 152, which couples to a collimating lens 154. Light from the collimating lens passes through a top-hat diffuser 156 and is directed to one or more detectors 102, e.g., a linear array of detectors (such as 3D LiDAR detectors).

The first attenuator 106 coarsely adjusts the attenuation of the light emitted by the laser. This is broadly set in line with the linear gain of the sensor 102. For a linear-mode avalanche photodiode (LMAPD) detector array, the linear gain scales as:

$$\propto M/\sqrt{F}$$

where M is the linear gain, and the excess noise factor is:

$$F = M\left(1 - (1 - k)\left(\frac{M-1}{M}\right)^2\right)$$

provided by, noting that k is the ionization constant, which is material specific. The below table provides an overview of what values would be used for the coarse adjustment α, calculated from an estimated value of M and F. A second attenuator is required to fine tune the system and for characterization of the sensor parameters such as range walk error and responses.

TABLE 1

| M [p.u.] | F [p.u.] | $M/\sqrt{F}$ [p.u.] | α [%] |
|---|---|---|---|
| 1.00 | 1.00 | 1.00 | 0.00% |
| 2.50 | 1.78 | 1.87 | 46.63% |
| 5.00 | 2.44 | 3.20 | 68.76% |
| 7.50 | 2.99 | 4.33 | 76.93% |
| 10.00 | 3.52 | 5.33 | 81.24% |
| 12.50 | 4.04 | 6.22 | 83.93% |
| 15.00 | 4.55 | 7.03 | 85.78% |

Figure 8:
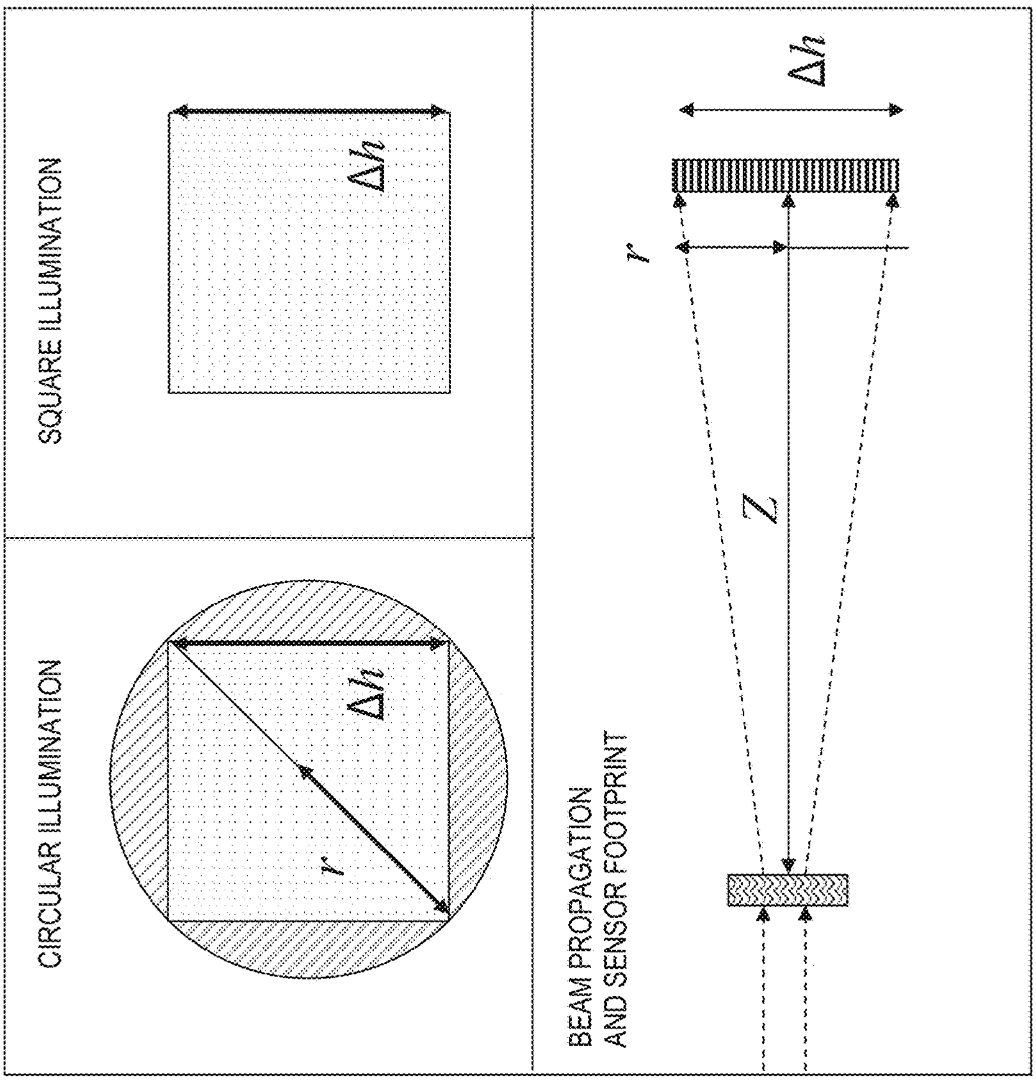
FIG. 8 illustrates a beam propagation and sensor footprint including circular and square illumination parameters.

Referring to FIG. 8, as discussed above, the system includes a fiber coupler housed within a collimating lens assembly (see 154, FIG. 7). This exits to an engineered diffuser (see 156, FIG. 7), which shapes the Gaussian beam profile into a flat-topped Super-Gaussian profile, diverging at a set angle. The divergence angle, θd, from this flat top diffuser to the linear detector arrays is set by $$\theta_d = \tan^{-1}[r/2z],$$

where r is the beam radius and the distance is provided by z. The beam radius is set as described in the below figure. For a circular profile beam:

$$r = \Delta h \frac{\sqrt{2}}{2}$$

while for a square profile beam:

$$r = \frac{\Delta h}{2}.$$

Figure 9:
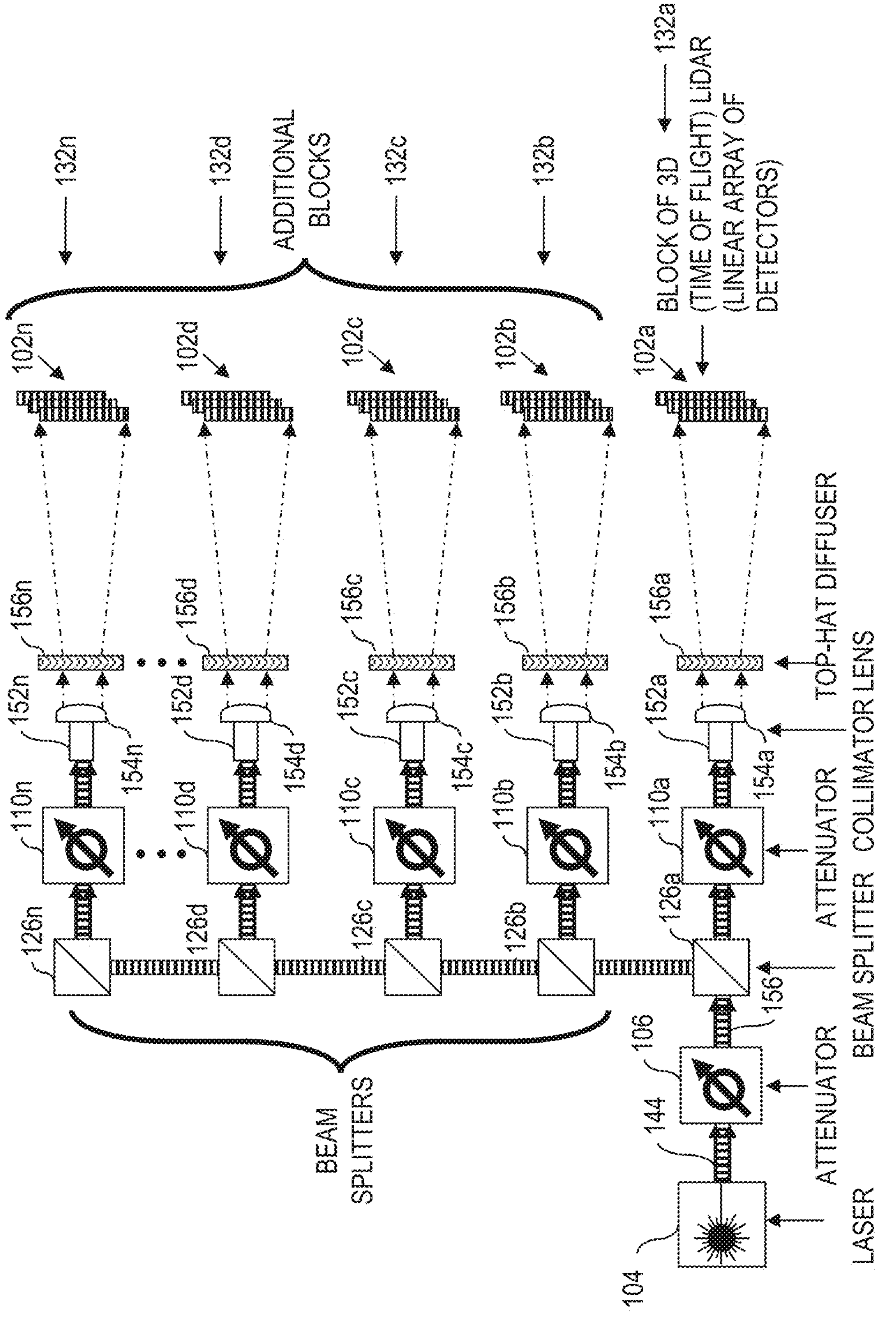
FIG. 9 illustrates yet another calibration system, the illustrated calibration system including blocks of linear array detectors.

Referring to FIG. 9, an illumination source 104 such a laser outputs a signal, which is passed via fiber optics 144 to a first attenuator 106 (e.g., a course attenuator as described more fully herein). The output from the first attenuator 106 is coupled to a primary block subsystem 132*a* and set of parallel additional block subsystems 132*b-n*. Each block subsystem 132*a-n* includes a beam splitter 126*a-n*. Light from the beam splitter travels via fiber optics to a secondary attenuator 110*a-n* (e.g., a fine attenuator as described more fully herein). In each block subsystem, the output of the primary attenuator couples via fiber optics to a collimator lens 154 (e.g., fiber coupler 152 and collimating lens 154 analogous to that described with reference to FIG. 7). The output of the collimating lens couples through an optional top-hat diffuser 156 in free space, and from the optional diffuser to a detector 102 (e.g., 3D (time of flight) LiDAR detector).

Multiple sensor arrays can be characterized and calibrated in the same compact system at once. Significant complexities for a system of this type are removed by using a linear array as compared to a full array of detectors, thus enabling removal of some system components that would otherwise be critical towards the functioning of a system used for characterization and correction of a set of full arrays. The aforementioned system effectively replaces a full array device in every block of the larger scaled system. The system also uses fiber optics, rather than free-space optics, except for the final throughput to illuminate the detector arrays. A secondary embodiment of this, would be to illuminate the top-hat diffuser directly from the fiber output. The top-hat diffuser works in a manner such that the entire beam will spread at a set divergence angle from the clear aperture of the diffuser. Thus, if the diffuser is set at an appropriate distance from the fiber output, there would be no need for additional lenses. The primary advantage is found in cost reduction when scaling this system.

Thus, embodiments herein can use any combination of fiber optics, free space, beam splitters, diverters, mirrors, or other optical devices etc., to direct light along travel path(s) of the system.

An advantage to this system is significantly reducing cost and complexity for characterizing sensor performance, while providing data that can be used for correction tables, such as range walk error or non-uniformity (dark frame and gain error corrections).

Moreover, aspects herein provide scalable, fast solutions for sensor calibration. For instance, some embodiments use a pattern for mitigating electronic crosstalk. By way of example, the pattern can be generated by illuminating a physical target downrange and rotating the target. Aspects herein can capture data capable of characterizing range walk, intensity and range responses, e.g., within 15 minutes or less. This makes sensor calibration practical in manufacturing, such as for autonomous vehicles, drones, robotic systems, and various 3D sensor systems with applications ranging from automatic checkout in stores to various government usage systems.

Figure 10:
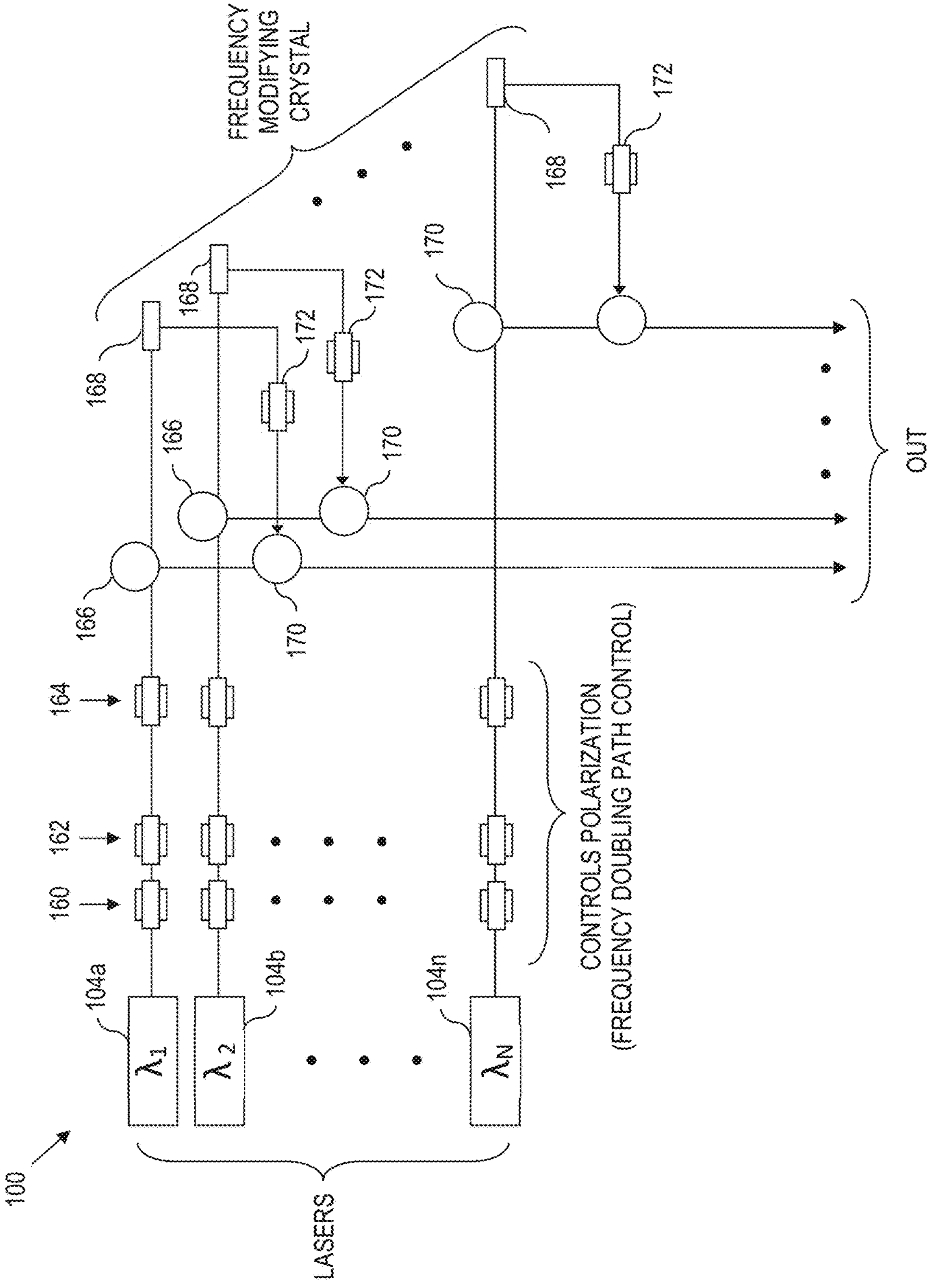
FIG. 10 illustrates a calibration system suitable for industrial scaling according to yet further aspects herein.

Turning now to FIG. 10, another embodiment of a system 100 enabling industrial scaling of characterization of 3D flash LiDAR focal plane arrays is shown. The embodiment of FIG. 10 further enables automation of the system 100, further limits technical requirements for operation and simplify long term maintenance, while adding capabilities to the system that enable a fuller characterization of the detector or detector array, including temperature dependency, modular transfer function, and spectral response. In total the embodiment of FIG. 10 has several primary characteristics of the camera that can be tested simultaneously with other focal plane arrays. Data collection can take place very quickly, thus enabling collection of sufficient data to characterize many focal plane arrays simultaneously within hours, as compared to weeks or months using highly trained labor for the current state of the art for a single system. This system enables a massive paradigm shift in scalability that enables complete characterization of industrially produced 3D flash LiDAR systems without significant additional cost beyond initial investment.

In FIG. 10, a set of seed laser systems 104*a-n* with fiber outputs, each laser operating with a different wavelength, will be fed to a first linear polarizer 160, a half wave plate 162, which feeds a second linear polarizer 164, via another fiber or intermittent free space. If fiber is used to optically couple the half-wave plate to the second linear polarizer, then a birefringent optic of the second linear polarizer is allowed to rotate independently of an axis of the fiber. The birefringent optic will be enabled to rotate by means of a motorized rotation stage for automated control.

Thus, the beam's polarization is controlled before reaching a polarized fiber splitter 166. While the topology discussed above polarizes the beam, other means of polarization control may be used instead or in conjunction. The polarized fiber splitter 166 splits the beam by polarization, such that when the beam is polarized is in an orientation matching a pass-through polarization for the polarized fiber splitter, the beam will travel to a frequency modifying crystal 168, and recombine at another polarization fiber splitter 170 after traveling through a half wave plate 172 that has been mounted at a set rotation to enable recombining with the beam path. For example, if the polarized fiber splitter has a horizontal or vertical orientation, by adjusting the orientation of the polarization between vertical and horizontal, the beam can be controlled to pass to the frequency doubling crystal or to continue along track without being affected by frequency modification.

Other methods of splitting the beam in a controlled manner to enable frequency modification of the laser pulse may be used instead of or in conjunction with the method described herein. When the beam is not to be frequency doubled, it will simply bypass the frequency doubling by means of the polarization fiber splitter 166. This design feature enables production of many more wavelength laser beams than could otherwise be achieved without purchase of a laser 104 per wavelength system, thus significantly reducing cost of the initial system.

Figure 11A:
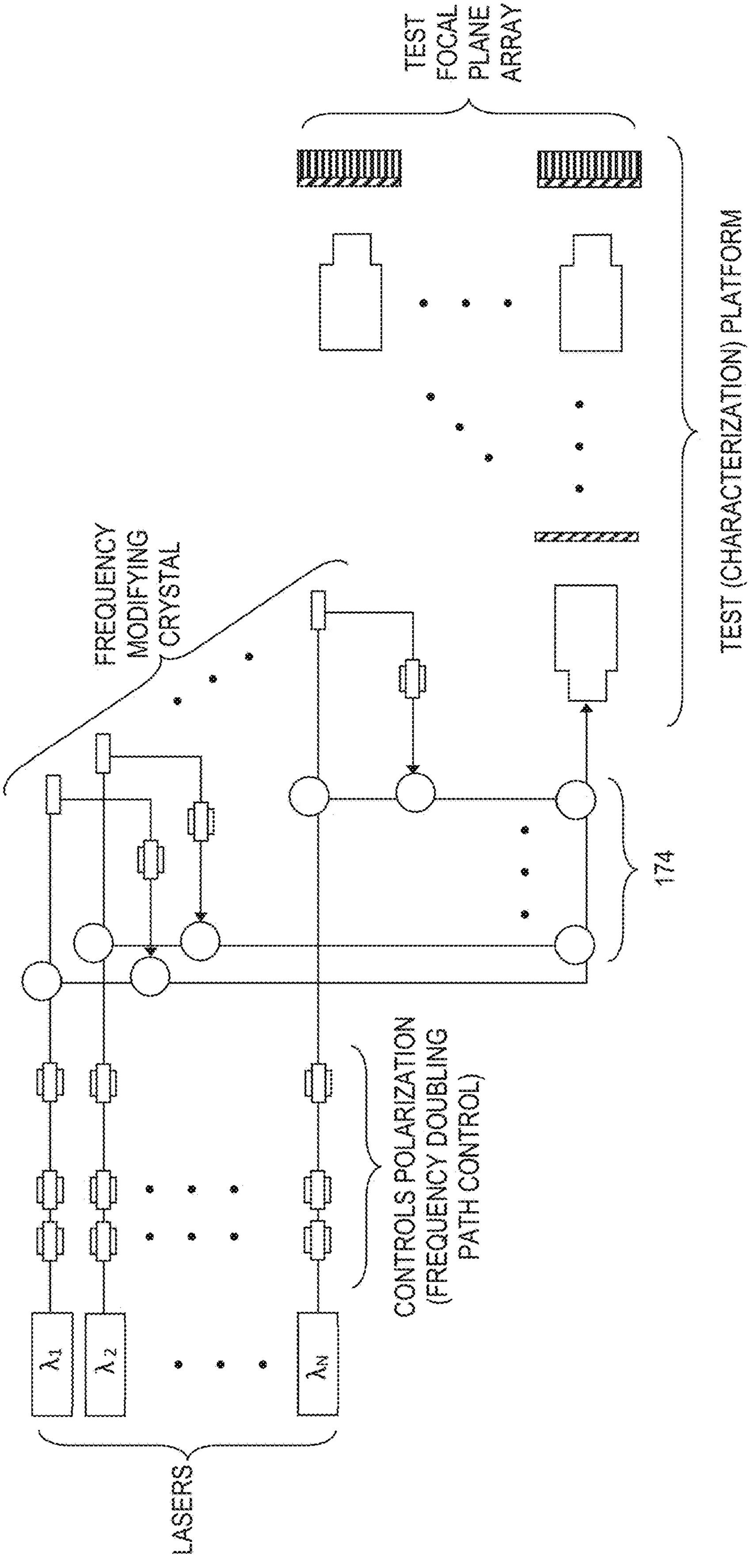
FIG. 11A illustrates a calibration system suitable for industrial scaling and a test platform, according to aspects of the disclosure.
Figure 11B:
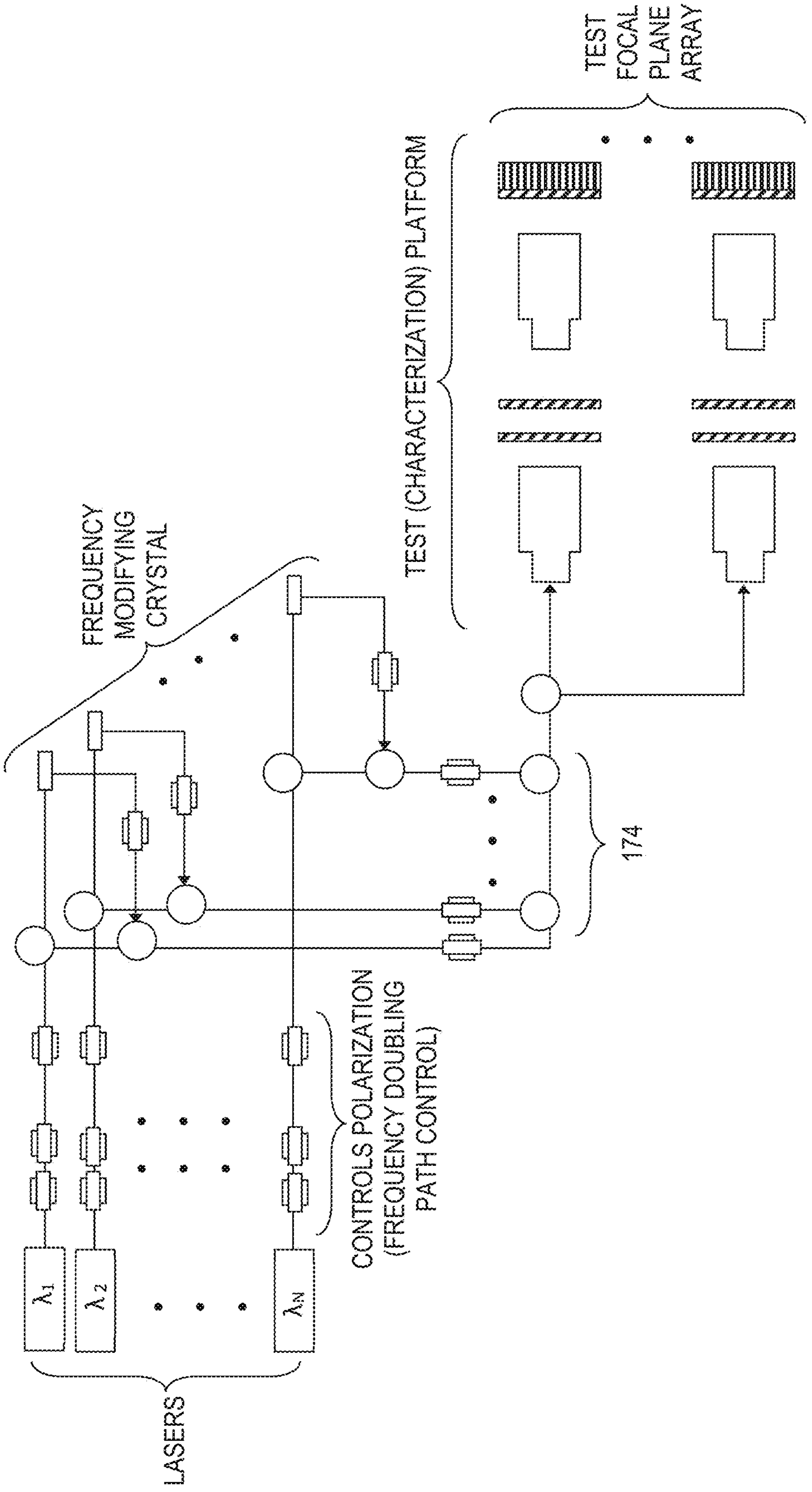
FIG. 11B is a block diagram of another embodiment of a calibration system for industrial scaling and a test platform, according to aspects of the disclosure.

Turning to FIGS. 11A-B, a final fiber splitter 174 combines the fiber paths (after an optional half wave plate 176 in FIG. 11B) into a single, main fiber. It should be noted that only a single laser will be active at any time, and the polarization properties of the system should prevent secondary, frequency modified beams from being detected.

Figure 12:
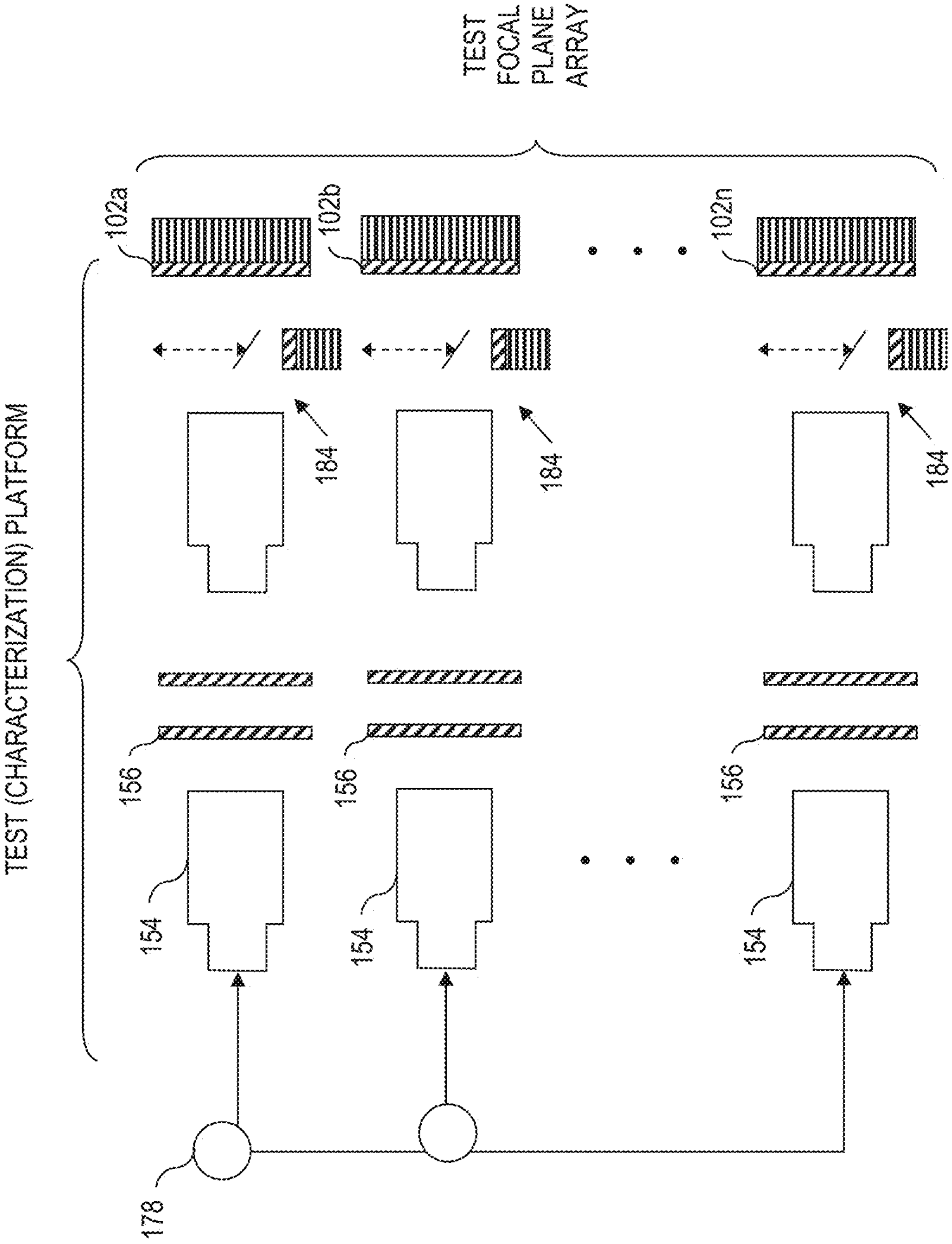
FIG. 12 illustrates a test platform for embodiments of the calibration system for industrial scaling, according to aspects of the present disclosure.

Turning to FIG. 12, the main fiber output will then connect into the fiber connectors 178 for the characterization testbed. The fiber will output to an engineered, top-hat diffuser 156 for each focal plane array under test 102*a-n*. Embodiments of the system described in FIGS. 10-12 mimic radiometric properties of a non-laser source to bypass an issue of not generating a responsivity curve by having additional wavelength sources of laser radiation to interpolate a response curve over.

Figure 13:
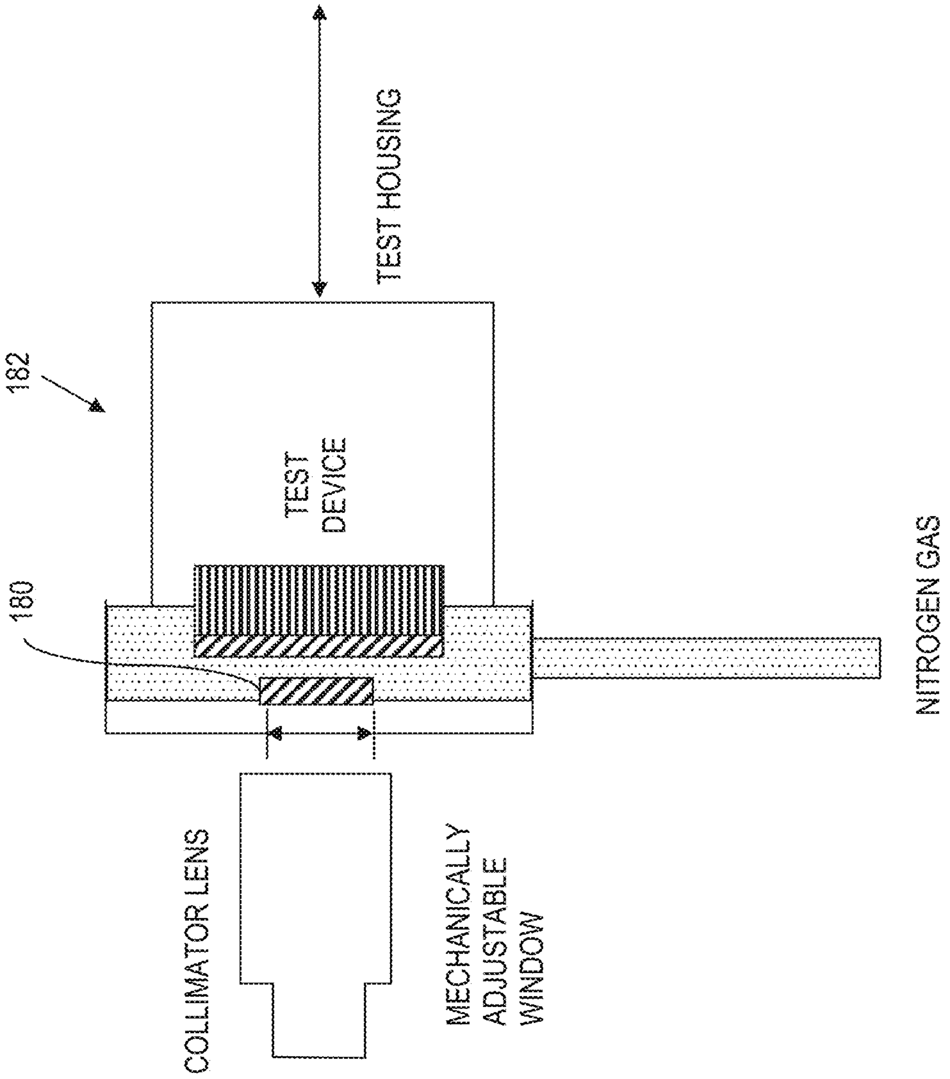
FIG. 13 illustrates a windowing feature of embodiments of the calibration system suitable for industrial scaling, according to aspects of the present disclosure.
Figure 14:
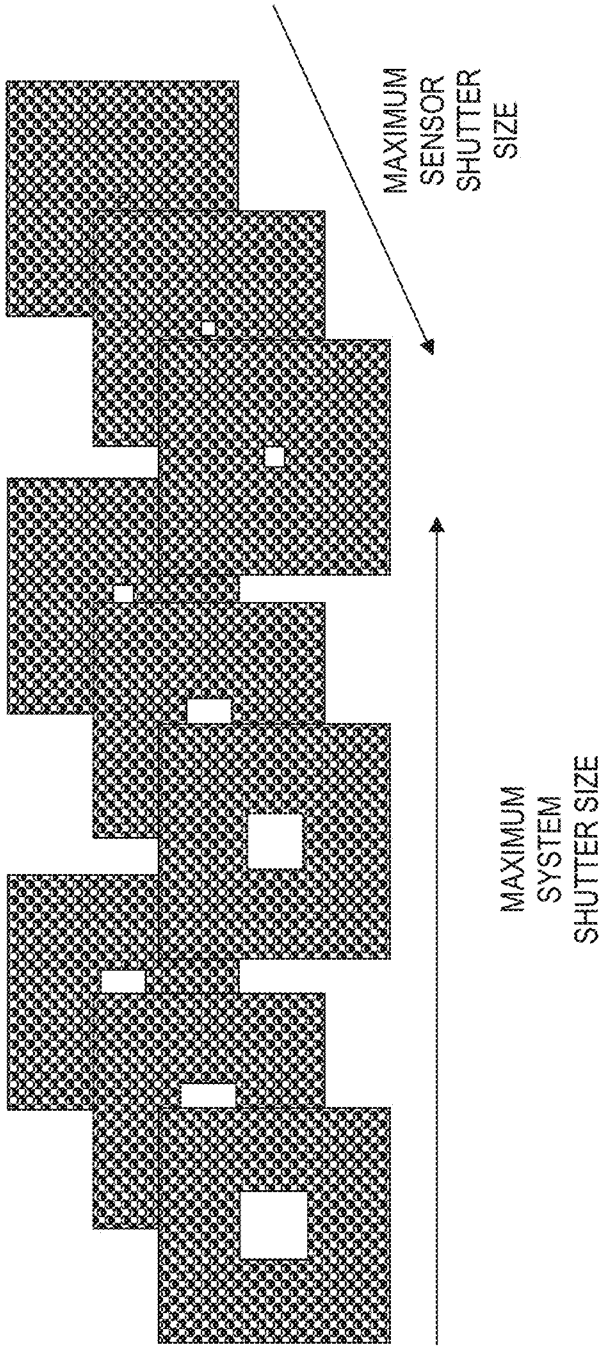
FIG. 14 is a diagram illustrating a maximum sensor shutter size and a maximum system shutter size, according to aspects of the present disclosure.

Turning to FIG. 13, a mechanical window 180 is mounted in a manner that a distance providing sharpest focus of the window along the optical axis can be automatically sought. The window is mounted on a linear track relative to the focal plane array. An optional mirror (see 184 in FIG. 12) can be mechanically pivoted into position, with an optical power meter 182 calibrated to be the same path length as the focal plane array. Ensuring that irradiance collected from the optical power meter 182 is as constant as possible relative to incrementally opening the mechanical window 180 ensures minimizing the effects of diffraction from the window on data collection. The window 180 is necessary to reduce the risk of sensor damage, and can be used to test a knife edge response and thus modular transfer function per detector.

Testing the spectral response is the primary reason for a multiple laser system including frequency modifying optics. Each of these lasers can therefore supply at least two spectral samples that are sufficient for characterizing the full response of a time-of-flight camera.

In some embodiments, the focal plane array is temperature controlled, using a thermoelectric cooling system combined with a controlled flow refrigeration system enables both heating and cooling of a testing chamber. As shown in FIG. 13, the testing chamber is filled with inert gas (e.g., nitrogen), non-reactive to electronic materials, but also should avoid using a vacuum due to the complexity of operation, cost of training personnel, maintenance cost and requirements, and general complications to system design. Inert gasses are also suggested to push water content out. Addition of a desiccant in the testing chamber may prevent or limit condensation in testing involving cooling the system.

Thermal heating to test thermal limits of the detectors under test would precede cooling to test the thermal limits. In both cases all characterization data from the testing is collected incrementally. The tests commence by capturing a set number of dark frames per temperature, opening a shutter and capturing a set number of frames, adjusting attenuation, and capturing more frames, until a signal-to-noise ratio is increased to usable levels. For the first, highest signal increment, a mechanical window will test for the maximum system shutter size by increasing the window size while computing a live running value measure of the standard deviation of dark noise (i.e., a return without signal). When the part of the return without signal begins to see an increase in noise, that is the cutoff for the maximum sensor shutter size. The smallest of these maximum sensor shutter sizes for the entire system block is the maximum system shutter size. This is the shutter size used for windowing data captures.

Using embodiments of the system described herein, which include components configured differently than those for an analogous system for calibrating a 2D LiDAR sensor, allows for calibration of a time-of-flight (3D) LiDAR sensor/camera. further, radiometric characterization and calibration may be performed using embodiments of the system described herein, where one of the optical components is an integrating sphere illuminated by a lamp.

Moreover, aspects of the system described herein are scalable, as discussed above. Application of a splitter to characterizing and calibrating 3D LiDAR systems provides a further improvement over state of the art systems. The current solutions illuminate a single detector on a sensor at a time to characterize the system for quality control in 3D LiDAR cameras. Therefore, current solutions take very long and are a highly experimental or incomplete process for sensors with larger numbers of detectors. However, the timing synchronization as applied to the system described herein enables the clock-based timing of the system for a time-of-flight (3D) LiDAR. Further, the spatial light modulator or phase grating to pattern the light from the transmission source (as discussed above) mitigates crosstalk between the detectors. Therefore, a variable focus zoom lens can adjust a magnification to ensure the proper alignment of the patterned light on the sensor/camera. Also, in embodiments of the system described herein, the fine and coarse adjustment attenuators prevent damage to the sensor and control signal strength in a controllable and measurable manner that enables characterizing response Thus, more than one detector in a sensor/camera may be calibrated at the same time.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A system for calibrating a plurality of light detection and ranging (LiDAR) sensors, the system comprising:
- an optical transmission source;
- a coarse adjustment optically coupled to the optical transmission source;
- an optical device optically coupled to the coarse adjustment;
- a splitter optically coupled to the optical device to simultaneously test the plurality of LiDAR sensors;
- a fine adjustment for each of the plurality of LiDAR sensors and optically coupled to the splitter, wherein the fine adjustments are each associated with a LiDAR sensor of the plurality of LiDAR sensors; and
- a lens, for each of the LiDAR sensors, optically coupled to the fine adjustment, wherein light from the optical transmission source passes through the coarse adjustment, the optical device, the fine adjustments, and the lenses to illuminate the LiDAR sensors.

2. The system of claim 1, wherein the optical transmission source is a pulsed laser.

3. The system of claim 1, wherein the splitter comprises:
- a relay lens;
- a motorized rotation stage optically coupled to the relay lens;
- a half-wave plate optically coupled to the motorized rotation stage; and
- a polarized beam splitter for each of the LiDAR sensors.

4. The system of claim 1, wherein:

the optical transmission source comprises:

an optical device for frequency modification; and pulsed laser sources operating at separate wavelengths; and the transmission source optically couples to the LiDAR sensors via a polarized beam splitter for each wavelength tested.

5. The system of claim 1, further comprising a controller coupled to receive feedback from the LiDAR sensors.

6. The system of claim 5, wherein:

the fine adjustments are variable attenuators; and the controller controls, based on the feedback, the variable attenuators individually to incrementally let the light through the fine adjustments until a saturation level of the associated LiDAR sensor is reached.

7. The system of claim 6, wherein the controller averages the feedback from each of the LiDAR sensors over time such that the controller creates a number of average feedbacks equal to the number of LiDAR sensors.

8. The system of claim 6, wherein:

the lenses are variable focus lenses; and the controller controls, based on the feedback, the variable focus lenses individually to increment, based on the feedback, focal lengths of the variable focus lenses to magnify the light to minimize sampling issues from the light for the associated LiDAR sensors.

9. The system of claim 8, wherein the controller averages the feedback from each of the LiDAR sensors over time such that the controller creates a number of average feedbacks equal to the number of LiDAR sensors.

10. The system of claim 5, wherein:

the lenses are variable focus lenses; and the controller controls, based on the feedback, the variable focus lenses individually to increment, based on the feedback, focal lengths of the variable focus lenses to magnify the light to minimize sampling issues from the light for the associated LiDAR sensors.

11. The system of claim 10, wherein the controller averages the feedback from each of the LiDAR sensors over time such that the controller creates a number of average feedbacks equal to the number of LiDAR sensors.

12. The system of claim 1, wherein:

the optical transmission source is coupled to the coarse adjustment via optical fiber;

the coarse adjustment attenuator is coupled to the optical device via optical fiber;

the optical device is coupled to the splitter via optical fiber;

the splitter is coupled to the fine adjustments via optical fiber; and the fine adjustments are coupled to the lenses via optical fiber.

13. The system of claim 1, wherein:

the optical transmission source is coupled to the coarse adjustment via free space;

the coarse adjustment is coupled to the optical device via free space;

the optical device is coupled to the splitter via free space;

the splitter is coupled to the fine adjustments via free space; and the fine adjustments are coupled to the lenses via free space.

14. The system of claim 1, wherein the optical device is transparent.

15. The system of claim 1, wherein the optical device is a spatial light modulator that imparts a pattern onto the light through the optical device.

16. The system of claim 1, wherein the optical device is a phase grating that imparts a pattern onto the light through the optical device.

17. A system for calibrating a plurality of light detection and ranging (LiDAR) sensors, the system comprising:

an optical transmission source;

a coarse adjustment optically coupled to the optical transmission source;

an optical device optically coupled to the coarse adjustment;

a splitter optically coupled to the optical device to simultaneously test the plurality of LiDAR sensors;

a fine adjustment optically coupled to the splitter; and a lens optically coupled to the fine adjustment, wherein light from the optical transmission source passes through the coarse adjustment, the optical device, the fine adjustment, and the lens to illuminate a LiDAR sensor of the plurality of LiDAR sensors.

18. The system of claim 17, wherein:

the optical transmission source comprises:

an optical device for frequency modification; and pulsed laser sources operating at separate wavelengths;

the splitter includes a polarized beam splitter for each wavelength tested; and the optical transmission source optically couples to the LiDAR sensors via the polarized beam splitter for each wavelength tested.

19. The system of claim 17 further comprising a controller coupled to receive feedback from the LiDAR sensors.

20. The system of claim 19, wherein:

the fine adjustments are variable attenuators; and the controller controls, based on the feedback, the variable attenuators individually to incrementally let the light through the fine adjustments until a saturation level of the associated LiDAR sensor is reached.

* * * * *